United States Patent [19]
Watanabe et al.

[11] Patent Number: 4,913,001
[45] Date of Patent: Apr. 3, 1990

[54] PISTON ASSEMBLY FOR COMPRESSORS

[75] Inventors: Ryuji Watanabe; Kiyoshi Tanaka, both of Oizumi; Hirokazu Kawakami, Ota, all of Japan

[73] Assignee: Sanyo Electric Co., Ltd., Osaka, Japan

[21] Appl. No.: 311,156

[22] Filed: Feb. 15, 1989

[30] Foreign Application Priority Data

Feb. 18, 1988 [JP] Japan .............................. 63-20462[U]

[51] Int. Cl.⁴ .......................... G05G 1/00; F01B 31/10
[52] U.S. Cl. .................................. 74/579 E; 74/579 R; 92/160; 123/193 CP
[58] Field of Search ................ 74/579 R, 579 E, 587, 74/583; 92/153, 158, 159, 160, 187; 184/24, 18; 123/197 AB, 193 CP; 29/156.5 A

[56] References Cited

U.S. PATENT DOCUMENTS

| 1,294,538 | 2/1919 | Rose | 92/160 X |
|---|---|---|---|
| 1,332,760 | 3/1920 | Saitta | 92/160 |
| 1,637,765 | 8/1927 | Comstock | 92/160 X |
| 1,787,638 | 1/1931 | Moore | 92/160 |
| 2,638,850 | 5/1953 | Ferris | 92/160 X |
| 2,741,519 | 4/1956 | Meurer | 92/160 |
| 2,818,314 | 12/1957 | Nicholas | 92/160 |
| 4,050,360 | 9/1977 | Powers et al. | 92/160 X |
| 4,056,044 | 11/1977 | Kamman et al. | 74/579 R X |
| 4,058,104 | 11/1977 | Swoager | 123/193 CP |
| 4,557,351 | 12/1985 | Volk | 184/18 |

FOREIGN PATENT DOCUMENTS

| 45-40204 | 12/1970 | Japan | 74/579 E |
|---|---|---|---|
| 0040064 | 3/1984 | Japan | 92/158 |
| 0806894 | 3/1981 | U.S.S.R. | 92/158 |

Primary Examiner—Vinh T. Luong
Attorney, Agent, or Firm—Darby & Darby

[57] ABSTRACT

A piston assembly for compressors wherein a piston is connected to a crankshaft by a connecting rod having a ball at its one end, the ball being, with the rear portion thereof, joined to the piston by clamping a clamp portion provided on the piston, while the front portion of the ball is in contact with a ball seat formed in the inner portion of the piston, the crankshaft being formed at its upper end with an oil outlet for scattering an oil upon ejection therefrom, the piston assembly being characterized in that a plurality of holes are formed in the clamp portion, the piston having a skirt portion formed with a plurality of holes opposed to the respective holes.

6 Claims, 4 Drawing Sheets (A)

(B)

(A)    (B)

PISTON ASSEMBLY FOR COMPRESSORS

BACKGROUND OF THE INVENTION

1. Field of the Invention

The present invention relates to a piston assembly for compressors, and more particularly to a piston assembly of the so-called ball joint type which is useful for compressors and in which a piston is connected to a crankshaft by a connecting rod having a ball at its one end, with the ball held in contact with a ball seat formed in the piston.

2. Description of the Prior Art

As disclosed, for example, in examined Japanese patent publication No. 45(1970)-40204, conventional piston assemblies of this type for use in compressors include, as shown in FIG. 6, a connecting rod 33 connecting a piston 32 to the crankpin 31 of a crankshaft 30 and having a ball 34 at its one end. The ball 34 is in contact with a ball seat 35 formed in the piston 32, while the piston 32 is formed at its rear end with a hollow cylindrical clamp portion 36 which is clamped toward the ball 34 to hold the ball 34 joined to the piston 32. The crankpin 31 has an oil outlet 37 for scattering an oil toward the piston upon ejection therefrom to cause the oil to fall onto the clamp portion 36 and thereby lubricate the surface of the ball 34 in sliding contact with the clamp portion 36.

With the above construction, the sliding surface of the piston 32 and the sliding surface of the ball 34 positioned toward the crankpin 31 are almost entirely covered with the clamp portion 36, and the clamp portion 36 is entirely covered with the skirt portion 38 of the piston 32, so that the oil forced out from the oil outlet 37 of the crankpin 31 is acutally applied to the sliding surfaces of the piston 31 and the ball 34 only in a very small amount. Thus, there arises the problem that these surfaces are prone to improper lubrication. This problem impairs the free movement of the piston assembly of the ball joint type to permit uneven contact or wear of the piston, causing the compressor to consume an increased amount of power and lowering the reliability thereof.

The main object of the present invention, which has been accomplished in view of the above problems, is to provide a piston assembly of the type described for compressors wherein the piston and the ball are given improved lubrication characteristics at their sliding surfaces to preclude uneven contact or wear of the piston and thereby reduce the power consumption of the compressor and improve the reliability thereof.

SUMMARY OF THE INVENTION

The present invention provides a piston assembly for compressors wherein a piston is connected to a crankshaft by a connecting rod having a ball at its one end, the ball being, with the rear portion thereof, joined to the piston by clamping a clamp portion provided on the piston, while the front portion of the ball is in contact with a ball seat formed in the inner portion of the piston, the crankshaft being formed at its upper end with an oil outlet for scattering an oil upon ejection therefrom. One of the important structural features of the piston assembly is that a plurality of holes are formed in the clamp portion, and that the piston has a skirt portion formed with a plurality of holes opposed to the respective holes. When the oil is ejected from the oil outlet of the crankpin and scattered toward the piston, the portion of oil falling onto the clamp portion can be guided through the holes of the clamp portion to the portion of the ball in sliding contact with the ball seat or to the ball portion in sliding contact with the clamp portion. Further the portion of oil falling onto the outer periphery of the piston is allowed to fall through the holes in the piston skirt portion into the holes of the clamp portion to add to the supply of oil to the sliding portion. This gives improved lubrication characteristics to the surfaces of the piston and the ball in sliding contact with each other, preventing the piston from uneven contact or wear. Since a plurality of holes are formed in the piston skirt portion and also in the clamp portion, the oil flowing in through the holes at one side of the piston and lubricating the sliding surfaces can be discharged through the holes at the other side, with the result that fresh oil can be supplied to the surfaces one after another at all times to assure further improved lubrication characteristics. Preferably at least two, more preferably three or four, holes are formed in each of the skirt portion and clamp portion of the piston. These holes preferably have a diameter of 1 to 3 mm.

The present invention provides as another aspect thereof a piston assembly for compressors wherein a piston is connected to a crankshaft by a connecting rod having a ball at its one end, the ball being in contact with a ball seat formed in the piston, the piston being provided with a hollow cylindrical clamp portion at its rear end, the ball being joined to the piston by clamping the clamp portion toward the ball with a synthetic resin ring interposed between the clamp portion and the ball, the piston assembly being characterized in that the clamp portion is so clamped by pressing that the radial wall thickness of the synthetic resin ring gradually decreases from one end thereof closer to the base end of the clamp portion toward the other end thereof.

Thus, the piston assembly has the important structural feature that the clamp portion is so clamped that the ring between this portion and the ball has a radial wall thickness gradually decreasing from its inner end toward the outer end thereof.

Because of this feature, the clamping force acting on the ring can be made greater at the outer end of the clamp portion and smaller at its base end. This reduces the substantial area of contact of the ring with the ball, inhibits deformation of the clamp portion outer end which is subjected to a great stress when the piston is moved, increases the freedom of movement of the ball to thereby render the piston movable with a smaller input force, and prevents the parts from backlashing more effectively. Since the substantial contact area can be reduced, the clamping force itself can be decreased, and the thermal expansion of the ring can be diminished during the operation of the piston assembly, consequently further increasing the freedom of movement of the ball. The ring is adapted to have an increased wall thickness toward the base end of the clamp portion and is therefore unlikely to slip off even when deforming due to deterioration.

Specifically stated, it is desirable that when the clamp portion is clamped, the synthetic resin ring have a wall thickness, for example, of 0.4 mm at the base end of the clamp portion and 0.1 mm at the outer end thereof.

BRIEF DESCRIPTION OF THE DRAWINGS

FIG. 3 (B) is an enlarged view of the portion B in FIG. 3 (A);

FIG. 5 (B) is a view in vertical section of the same; and

DETAILED DESCRIPTION OF THE PREFERRED EMBODIMENTS

The piston assembly of the invention for compressors comprises a connecting rod connecting a crankshaft drivingly rotatable by a motor to a piston reciprocatingly movable in a cylinder. The connecting rod is provided with a ball at its one end. The ball is joined to the piston by clamping a clamp portion provided on the piston, with the front portion of the ball in contact with a ball seat formed in the piston, to hold the rear portion of the ball with the clamp portion.

Preferably, a synthetic resin ring is interposed between the clamp portion and the ball. Even when the clamp portion springs back when clamped, the ring can then be held in intimate contact with both the clamp portion and the ball owing to the resiliency of its material, consequently preventing formation of a clearance between the clamp portion and the ball to diminish backlashing. Preferably, the ring is made of a fluoroplastic such as polytetrafluoroethylene. Polytetrafluoroethylene is more preferable to use in view of resistance to chemicals, heat and abrasion, etc. Before assembly, the ring preferably has a substantially uniform radial wall thickness of 0.2 to 0.5 and an axial width of 1.5 to 3.5.

According to the present invention, it is desirable that one end of the synthetic resin ring extend across the holes formed in the clamp portion, whereby the hole defining edges of the clamp portion are caused to bite into the ring, which in turn is bulged locally within the holes. Consequently, the ring can be prevented from displacement or idle rotation, permitting the clamp portion to be tightly held to the ball free of backlashing. On the other hand, the oil scattering toward the piston upon ejection from an oil outlet in the crankpin can be led through the holes to the sliding surfaces of the ball and the piston. Since the plurality of holes are formed in the clamp portion, the oil flowing in through the holes at one side of the piston and lubricating the sliding surfaces can be directly discharged through the holes at the other side, with the result that fresh oil with a reduced amount of sludge or the like can be supplied to the surfaces at all times to assure the surfaces of improved lubrication characteristics.

Figure 1:
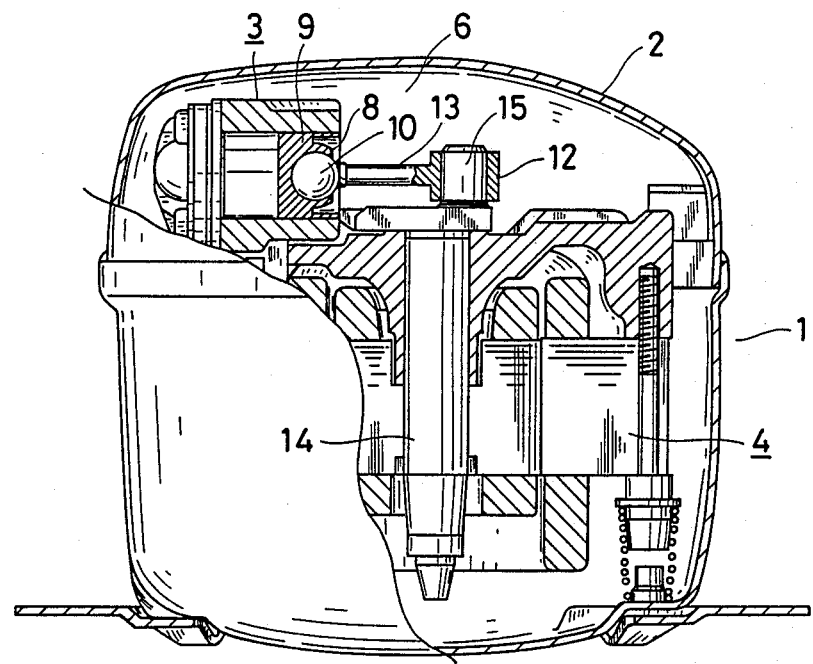
FIG. 1 is a view partly in vertical section of an enclosed compressor having incorporated therein a piston assembly embodying the invention.
Figure 2:
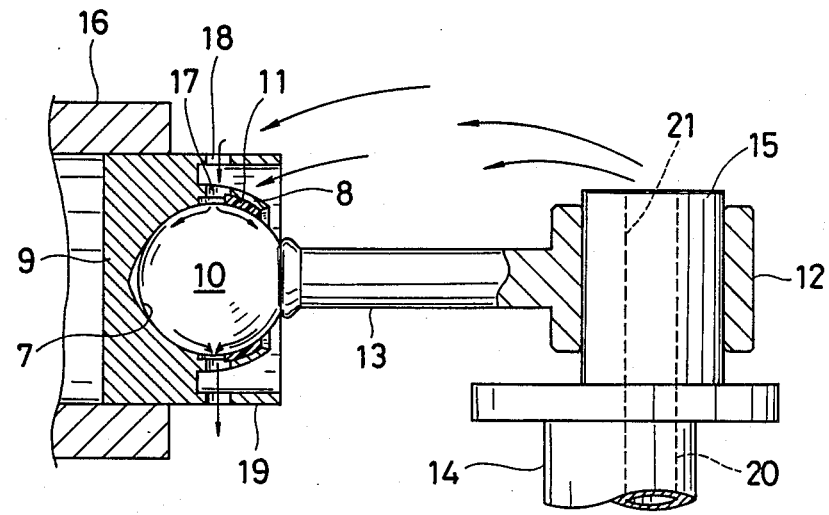
FIG. 2 is a sectional view of the piston assembly.

An embodiment of the invention will be described below with reference to FIGS. 1 and 2.

Indicated at 1 is a enclosed compressor which comprises a compressor unit 3 housed in the upper portion of a hermetic case 2 containing an oil at its bottom, and an electric motor unit 4 housed in the lower portion of the case and connected to the compressor unit 3 by a crankshaft 14. A piston assembly 6 included in the compressor unit 3 comprises a piston 9 having a ball seat 7 formed therein and a hollow cylindrical clamp portion 8 at its rear end, a ball 10 having a front portion in contact with the ball seat 7 in the piston 9 and a rear portion held by the clamp portion 8 by clamping this portion, a synthetic resin ring 11 interposed between the ball 10 and the clamp portion 8, and a connecting rod 13 joined at its one end to the ball 10 and having a hollow cylinder 12 at the other end thereof. The cylinder 12 of the rod 13 is fitted around the crankpin 15 of the crankshaft 14 to reciprocatingly move the piston 9 in a cylinder 16. Before clamping, a plurality of holes 17 are formed in the clamp portion 8 at a spacing. These holes 17 are so formed that both the ring 11 and the ball 10 can be partially seen therethrough. The piston 9 has a skirt portion 19 formed with a plurality of holes 18 which are spaced apart and opposed to the respective holes 17 in the clamp portion 8. The crankpin 15 has an oil outlet 21 communicating with an oil channel 20 in the crankshaft 14.

With the compressor piston assembly 6 thus constructed, the oil in the bottom of the closed case 2 is forced upward through the oil channel 20 by a centrifugal action of the crankshaft 14, ejected from the oil outlet 21 of the crankpin 15 and scattered toward the direction of rotation. Since the holes 17, 18 are formed in the piston clamp portion 8 and the piston skirt portion 19, respectively, the oil scattered toward the piston 9 partly falls onto the clamp portion 8 and is supplied to the portion of the ball 10 in sliding contact with the ball seat 7 or to the ball portion in sliding contact with the clamp portion 8. Further the portion of oil falling onto the outer periphery of the piston 9 flows through the holes 18 of the piston into the holes 17 of the clamp portion 8 to add to the supply of oil to the sliding portion. This gives improved lubrication characteristics to the sliding surfaces of the piston 9 and the ball 10 to prevent the piston 9 from uneven contact or wear. The holes 18 formed in the skirt portion 19, as well as those 17 in the clamp portion 8, are arranged at a spacing, so that as seen for example in FIG. 2, the oil flowing in through the holes 17, 18 at the upper side and lubricating the sliding surfaces can be rapidly discharged through the holes 17, 18 at the lower side. Consequently fresh oil which is less likely to contain sludge or worn particles can be supplied to the sliding surfaces at all times to further improve the lubrication characteristics of these surfaces. Since the holes 17, 18 are arranged at a spacing as stated above, the lubrication effect on the sliding surfaces will not be reduced even if the piston 9 rotates about its own axis during the operation of the piston assembly.

Both the ring 11 and the ball are accessible through the holes 17 formed in the clamp portion 8, so that when the clamp portion 8 is clamped the hole defining edges of the clamp portion are caused to bite into the ring 11, which in turn is locally bulged within the holes 17 and can therefore be firmly positioned in place against displacement or idle rotation, permitting the clamp portion 8 to be tightly held to the ball 10 to greatly diminish backlashing.

In brief, the piston assembly 6 of the ball joint type has a plurality of holes formed in the piston clamp portion and a plurality of holes formed in the piston skirt portion and opposed to the respective holes. Accordingly, the oil ejected from an oil outlet in the crankpin and scattered toward the piston partly falls onto the clamp portion and is led through the holes of the clamp portion to the sliding surfaces of the piston and the ball, while the scattered oil partly falls onto the outer periphery of the piston and flows through the skirt holes into the holes in the clamp portion to supply an additional portion of oil to the sliding surfaces. This improved the lubrication characteristics of the piston and ball sliding surfaces to diminish uneven contact or wear. Because the plurality of holes are formed in the skirt portion as well as in the clamp portion, the oil flowing in through the holes at one side of the piston and lubricating the sliding surfaces can be rapidly discharged through the holes at the other side, with the result that fresh oil can be supplied to the sliding surfaces at all times to further improve the lubrication characteristics of the surfaces. Consequently, the compressor incorporating the piston assembly is operable with reduced power consumption with higher reliability.

Figure 3:
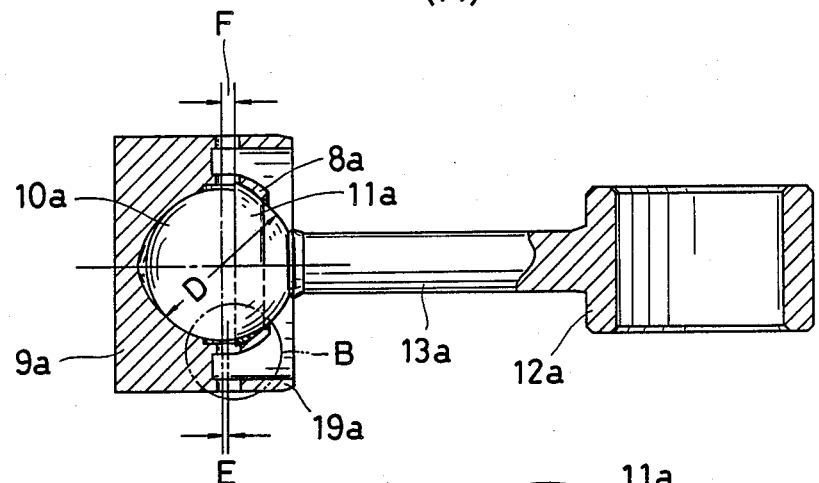
FIG. 3 (A) is a view partly in section and showing another embodiment of piston assembly.
Figure 3:
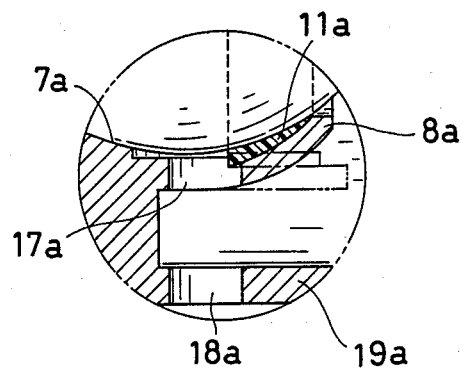
Figure 4:
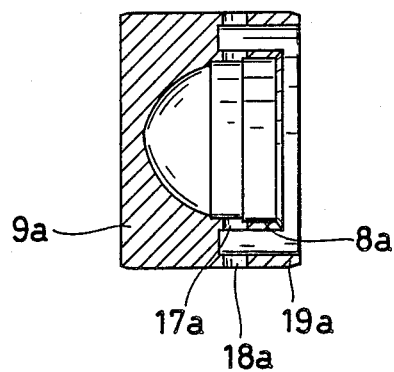
FIG. 4 is a sectional view of a piston before assembly.
Figure 5:
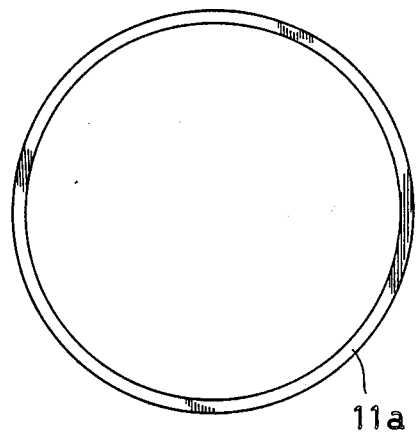
FIG. 5 (A) is a side elevation of a synthetic resin ring before assembly.
Figure 5:
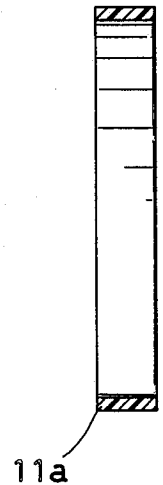
Figure 6:
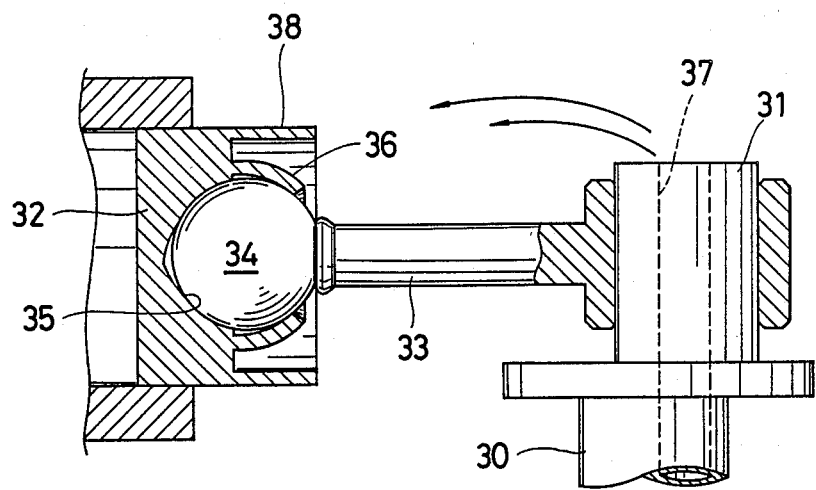
FIG. 6 is a sectional view of a conventional piston assembly.

Next with reference to FIGS. 3 to 5, another embodiment of the invention will be described, which has substantially the same construction as the foregoing embodiment except that a synthetic resin ring 11a is deformed differently by clamping a clamp portion 8a. Accordingly, a detailed description will not be given.

The clamp portion 8a is so clamped by pressing that the radial wall thickness of the ring 11a decreases gradually from one end thereof, closer to the base end of the clamp portion 8a, toward the other end thereof. Because of this feature, the clamping force acting on the ring 11a around a ball 10a can be made greater at the outer end of the clamp portion 8a and smaller at its base end. Thus, the surface pressure of the ring 11a on the ball 10a is locally increased at the outer end of the clamp portion 8a to reduce the substantial area of contact of the ring 11a with the ball 10a, inhibit deformation of the clamp portion outer end which is subjected to a great stress during the compression-intake movement of a piston 9a, increase the freedom of movement of the ball 10a to thereby render the piston 9a movable with a smaller input force, and prevent backlashing more effectively. Since the clamping force concentrically acts locally, the clamping force itself can be decreased, and the thermal expansion of the ring 11a can be diminished during the operation of the piston assembly 6a, thereby further increasing the freedom of movement of the ball 10a. The ring 11a is adapted to have an increased wall thickness toward the base end of the clamp portion 8a and is therefore unlikely to slip off even when deforming due to deterioration.

For reference, given below are exemplary specifications of the second embodiment shown in FIGS. 3 to 5.

Piston 9a: made of steel S 12 C
Wall thickness of clamp portion 8a before clamping: 0.65 mm
Holes 17a in clamp portion 8a:
    4 in number, 2 mm in diameter
    distance E between axis of hole 17a and center of ball 10a, 0.5 mm
Holes 18a in skirt portion 19a, coaxial with holes 17a:
    4 in number, 2 mm in diameter
Ball 10a:
    made of SUJ - 2 12.7 mm in diameter
Synthetic resin ring 11a:
    made of polytetrafluoroethylene
    radial wall thickness before assembly, 0.38 mm
    axial width before assembly, 2.5 mm
    wall thickness at inner end after clamping, 0.4 mm
    wall thickness at outer ed after clamping, 0.1 mm
    distance F between inner end of ring 11a and center of ball 10a, about 1 mm

What is claimed is:

1. A piston assembly for compressors having a piston connected to a crankshaft by a connecting rod having a ball at its one end, a rear portion of the ball being joined to the piston by clamping a clamp portion provided on the piston, a front portion of the ball being in contact with a ball seat formed in the inner portion of the piston, the crank-shaft being formed at its upper end with an oil outlet for scattering an oil ejected therefrom, the piston assembly characterized by: a plurality of holes formed in the piston clamp portion, the piston having a skirt portion formed with a plurality of holes opposed to the respective holes in the clamp portion, and, a synthetic resin ring, interposed between the clamp portion and the ball, the ring having an end portion extending across the holes formed in the clamp portion.

2. A piston assembly according to claim 1 wherein the number of holes formed in the piston skirt portion and the number of holes formed in the clamp portion are each 3 or 4.

3. A piston assembly according to claim 1 wherein each of the holes formed in the piston skirt portion is coaxial with the hole formed in the clamp portion and opposed thereto.

4. A piston assembly according to claim 3 wherein the holes formed in the piston skirt portion have the same diameter as the holes formed in the clamp portion.

5. A piston assembly according to claim 1 wherein the synthetic resin ring is a fluorocarbon resin ring.

6. A piston assembly according to claim 1 wherein the radial wall thickness of the synthetic resin ring gradually decreased from one end thereof closer to a base end of the clamp portion toward the other end thereof.

* * * * *